United States Patent [19]
Hirn et al.

[11] 3,823,741
[45] July 16, 1974

[54] FLUIDIC CONTROL ARRANGEMENT

[75] Inventors: Helmut Hirn, Dusslingen/Wurtt; Wolfgang Bott, Mossingen/Wurtt, both of Germany

[73] Assignee: Riko Maschinenfabrik GmbH & Co. KG, Dusslingen, Germany

[22] Filed: Oct. 25, 1972

[21] Appl. No.: 300,465

Related U.S. Application Data

[63] Continuation-in-part of Ser. No. 46,639, June 16, 1970, abandoned.

[30] Foreign Application Priority Data

| June 23, 1969 | Germany | 1931837 |
| Oct. 31, 1969 | Germany | 1954994 |
| Feb. 2, 1970 | Germany | 2004567 |
| Feb. 24, 1970 | Germany | 2008580 |

[52] U.S. Cl. ................ 137/625.48, 235/201 ME
[51] Int. Cl. ........................................... F16k 11/10
[58] Field of Search .......... 137/625.48, 625.4, 829, 137/830, 832; 235/201 ME

[56] References Cited
UNITED STATES PATENTS

| 3,168,898 | 2/1965 | Samet | 235/201 ME |
| 3,422,259 | 1/1969 | Freeman | 235/201 ME |
| 3,469,456 | 9/1969 | Riordan et al. | 235/201 ME |
| 3,504,692 | 4/1970 | Goldstein | 235/201 ME |
| 3,575,209 | 4/1971 | Kast | 137/804 X |
| 3,631,879 | 1/1972 | Larson | 235/201 ME |
| 3,720,217 | 3/1973 | Matthews et al. | 137/805 |

Primary Examiner—Henry T. Klinksiek
Attorney, Agent, or Firm—Hans Berman; Kurt Kelman

[57] ABSTRACT

A quick-acting control arrangement for hydraulic machinery includes a cylindrical valve chamber formed with a discharge orifice in one radial end wall, a control orifice in the other radial end wall, and a supply orifice in the cylindrical chamber wall near the first-mentioned end wall. Respective conduits connect the discharge orifice to the controlled machinery, the supply orifice to a suitable pump and the control orifice to a valve which may vent the valve chamber to the sump of the pump or connect it to a source or control pressure. A spherical control element in the chamber moves axially to seal the control orifice or the discharge orifice in response to the pressure prevailing at the control orifice. Modification of this valve and applications to single-acting and double-acting reciprocating hydraulic motors are illustrated.

14 Claims, 4 Drawing Figures

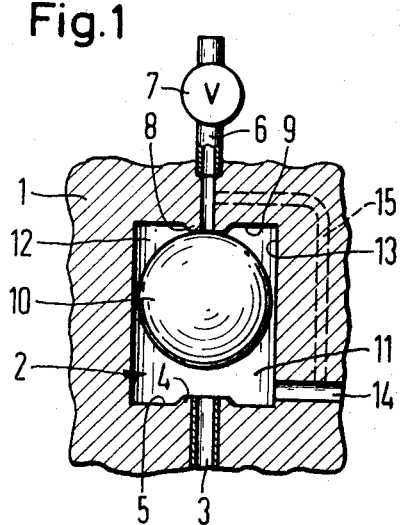

FLUIDIC CONTROL ARRANGEMENT

This application is a continuation-in-part of U.S. Pat. application Ser. No. 46,639, filed on June 16, 1970, and now abandoned.

This invention relates to fluidic control arrangements, and particularly to shut-off valves for quickly controlling the flow of hydraulic fluid at high pressure.

In one of its more specific aspects, the invention is concerned with improvements in known fluidic control devices in which a control element may move in a control chamber between two terminal positions and divides the chamber into two compartments when in an intermediate position, the compartments being connected by an annular throttling passage between the control element and the chamber walls.

It is an object of this invention to provide fluidic control devices of the type described which are simpler to manufacture than those available heretofore, yet permit a heavy stream of hydraulic fluid to be started and stopped almost instantaneously, and much faster than was possible heretofore.

It is another object to provide such control devices which may be opened and closed by means of minimal forces.

According to one of the more specific aspects of this invention, an elongated control chamber is bounded by an annular longitudinal wall and longitudinally spaced first and second end walls. A discharge conduit terminates in a discharge orifice in the first end wall, and a normally much narrower control conduit terminates in a control orifice in the second end wall. A spherical control element is longitudinally guided in the chamber by the walls between two terminal positions in which it seals the orifices respectively.

The control element and the first end wall longitudinally bound a first compartment in the chamber in all positions of the element, and the latter together with the second end wall bounds a second compartment in all positions of the element intermediate its terminal position. A restricted throttling passage is bounded by the element and the annular chamber wall and connects the two compartments.

A supply conduit terminates in a supply orifice in the chamber walls and directly communicates with the first compartment through the supply orifice in all positions of the control element. It is connected to a first source of fluid, more specifically a source of liquid under pressure. A second source of fluid under pressure is connected to the control conduit which is equipped with a valve. The valve may be shifted either to permit fluid from the second source to flow into the second compartment or to vent the control conduit for release of pressure fluid from the second compartment.

Other features, additional objects, and many of the attendant advantages of this invention will readily become apparent from the following detailed description of preferred embodiments when considered in connection with the appended drawing in which:

FIG. 1 shows a fluidic control arrangement of the invention in elevational section;

FIG. 2 illustrates a structural modification of a portion of the device of FIG. 1;

FIG. 3 shows the cooperation of two devices as shown in FIG. 2 in controlling a single-acting hydraulic motor, the view being in elevational section and somewhat diagrammatic.

Figure 4:
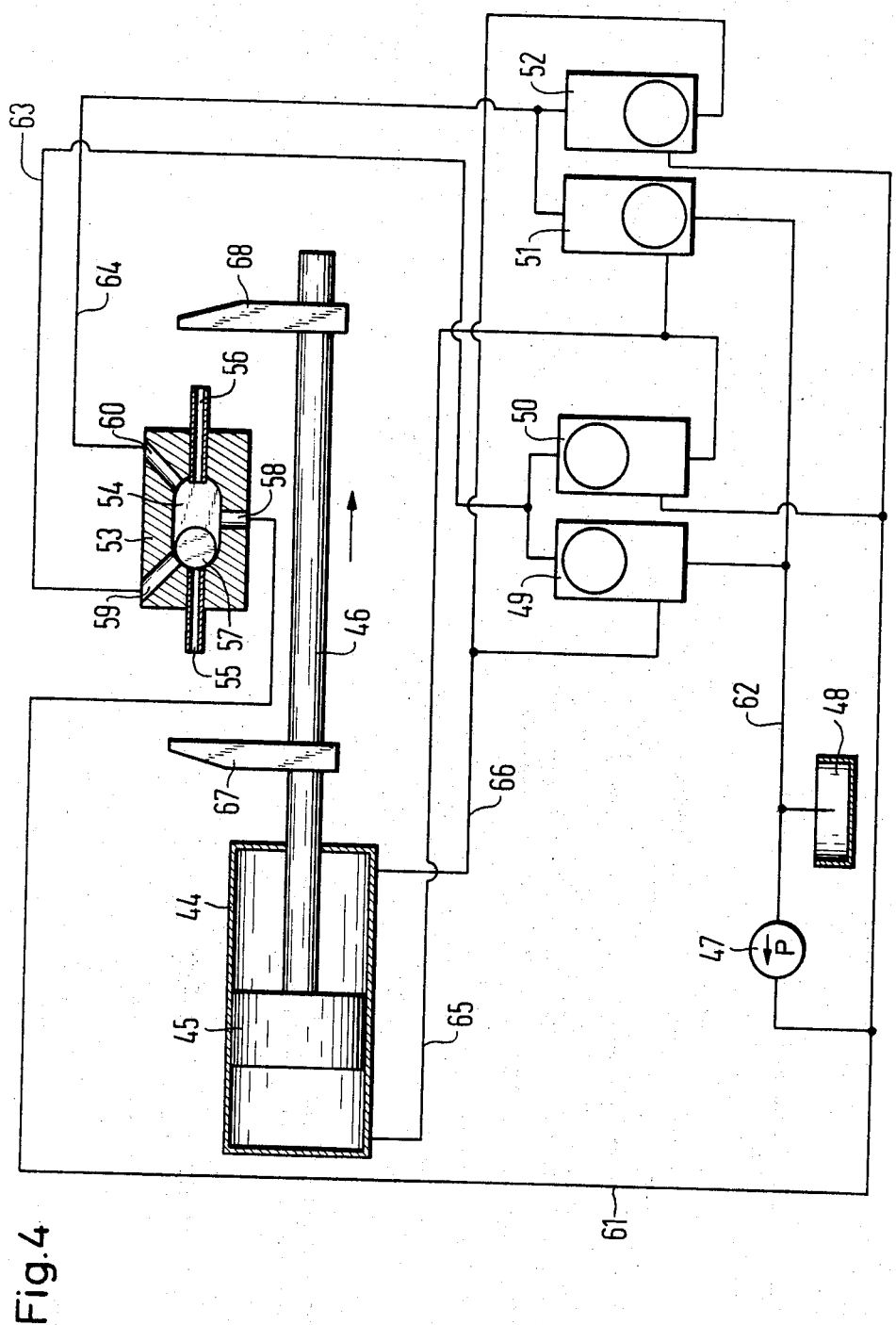
FIG. 4 illustrates the use of four devices of the type illustrated in FIG. 2 for controlling a double-acting reciprocating hydraulic motor, the view being partly in elevational section and partly conventional.

Referring now to the drawing in detail, and initially to FIG. 1, there is seen a valve casing 1 which provides the walls of an axially elongated, generally cylindrical control chamber 2. A discharge conduit 3 leads outward of the chamber 2 from an orifice of a raised valve seat 4 centered in a circular, radial end wall 5 of the chamber 2. A control conduit 6 provided with a rotary shut-off valve 7 similarly leads outward from a raised valve seat 8 centered in the second radial end wall 9 of the chamber 2.

A steel ball 10 whose diameter is slightly smaller than that of the chamber 2 and the two radial end walls respectively bound two compartments 11, 12 in the chamber 2 in the direction of chamber elongation. The cylindrical longitudinal wall 13 of the chamber 2 guides the ball 10 between two terminal positions in which the ball sealingly engages the valve seats 4, 8 respectively.

A supply conduit 14 terminates in an orifice which is open toward the compartment 11 in all positions of the ball 10, the orifice being located in the cylindrical chamber wall 13 immediately adjacent the first radial end wall 5. A bore 15 in the casing 1 provides a restricted feedback conduit outside the chamber 2 from the supply conduit 14 to the compartment 12, the feedback conduit 15 communicating with the portion of the control conduit 6 intermediate the shut-off valve 7 and the orifice in the valve seat 8.

The apparatus illustrated in FIG. 1 may control the flow of a heavy stream of liquid under high pressure in response to a small force employed for opening and closing the shut-off valve 7, which thus functions as a pilot valve.

Typically, the supply conduit 14 may be connected to the pressure outlet of a positive displacement pump, and the discharge conduit is connected to a reciprocating or rotating motor operated by the fluid. The valve 7 is connected to the open sump from which the pump draws the liquid to be supplied. When the valve 7 connects the control conduit 6 to the sump, the fluid pressure in the first compartment 11 is higher than that in the second compartment 12, and the ball 10 is shifted to the position shown in FIG. 1 in which it engages the valve seat 8. During movement of the ball 10 into the illustrated terminal position, a small amount of liquid leaks through the annular, restricted throttling passage or gap between the ball and the cylindrical wall 13 and reduces friction between the ball and the casing 1 to a negligible value. The flow section of the annular gap combined with that of the feedback conduit 15 is not sufficient to permit the pressure in the compartment 12 to equal that in the compartment 11 which directly communicates with the supply conduit 14 in all axial positions of the ball 10.

When the valve 7 is closed, the liquid pressure prevailing in the supply conduit 14 acts on the surface portion of the ball 10 which is exposed in the valve seat 8, and the pressures in the compartments 11, 12 are equalized through the gap between the ball 10 and the wall 13. Under normal conditions of flow, the pressure in the compartment 11 is lower than that in the conduit 14, and the difference in pressure is sufficient to lift the ball from the valve seat 8. Thereafter, the compartment 12 receives liquid under line pressure from the feedback conduit 15, and the ball is quickly shifted to the non-illustrated terminal position in which it seals the orifice of the discharge conduit 3.

While the casing 1 has been shown in FIG. 1 as a unitary body, it will be appreciated that it needs to be assembled from several parts, not in themselves relevant to the operation of the device. A preferred actual embodiment of the power valve of the invention is shown in FIG. 2.

The casing of the valve includes a body portion 16 having a stepped cylindrical bore. The narrowest part 17 of the bore provides a discharge conduit corresponding to the conduit 3 in FIG. 1. The axially short, widest portion of the bore receives a centrally apertured, flat, circular disc 18 from which an integral, cylindrical sleeve 19 depends coaxially into the axially central portion 20 of the bore in the body portion 16. The diameter and the axial length of the bore portion 20 are substantially greater than the corresponding dimensions of the sleeve 19 so that an annular gap 21 is formed between the free circular edge of the sleeve 19 and the radial bottom wall of the bore portion 20.

The sleeve 19 has an internal diameter greater than the width of the gap 21, and a ball 22 received in the sleeve with little clearance thus separates two compartments bounded by the sleeve 19, the disc 18, and the body portion 16, and may more axially in the sleeve 19 between terminal positions in which it seals the central aperture in the disc 18 and the discharge conduit 17 respectively. A wide supply conduit 23 leads into the annular space 24 which radially separates the sleeve 19 and the body portion 16 so that the gap 21 constitutes an annular supply orifice for the control chamber radially defined by the sleeve 19. The upper surfaces of the body portion 16 and of the disc 18 are flush and are held in position by a cover plate 25 and suitable fasteners, not illustrated. A bore 26 in the plate 25 constitutes a control conduit jointly with the aligned central aperture of the disc 18, and sealing rings 27 are provided between the parts 16, 18, 25 of the valve casing as needed to prevent loss of liquid under pressure.

A feedback conduit and a shut-off valve may be combined with the power valve illustrated in FIG. 2 in a manner obvious from FIG. 1 to permit operation as described with reference to FIG. 1, but several power valves of the structure illustrated in FIG. 2 may be combined for control of reciprocating or rotating hydraulic motors, as will be described with reference to FIGS. 3 and 4 in which the power valves have been illustrated diagrammatically in the shape of FIG. 1 for the convenience of pictorial representation.

FIG. 3 shows a fluidic control arrangement suitable for a single-acting, reciprocating, hydraulic motor such as a jack or hydraulic lift. It includes two power valves 25, 26, each substantially identical with the valve shown in FIG. 2, and two identical, two-way, pilot valves 27, 28. The pilot valves have valve chambers 29, 29' and valve seats 30, 31 and 30', 31' in respective opposite walls of the chambers. A stainless steel ball 32, 32' may be pushed from one seat to the other by the generally rod-shaped armature 33 of a fixedly mounted solenoid 34, respective ends of the armature extending into the chambers of both valves 27, 28 through suitable packings 35, not shown in detail and conventional in themselves.

The wide supply conduit 36 of the valve 25 is connected to the output side of a non-illustrated, positive displacement pump, and the equally wide discharge conduit 37 leads to the cylinder of the non-illustrated jack or lift. The control conduit 38 is connected with the valve chamber 29 of the pilot valve 27, and a feedback conduit 39 connects the supply conduit 36 with the valve seat 30. The orifices in the valve seats 31, 31' and the discharge conduit 40 of the power valve 26 are connected to the open sump (not shown) of the non-illustrated pump. The supply conduit 41 of the valve 26 is connected to the discharge conduit 37 of the valve 25 and thus to the cylinder of the jack or lift, and the control conduit 42 of the valve 26 is connected with the chamber 29' of the pilot valve 28. The valve seat 30' of the latter is connected by a conduit 43 and the supply conduit 36 to the output side of the non-illustrated pump.

The armature 33 is biased toward the illustrated position by a spring obscured by the solenoid 34, and moves toward the right, as viewed in FIG. 3, when the solenoid is energized. In the illustrated position, the armature 33 holds the ball 32 of the pilot valve 27 in sealing engagement with the valve seat 30 against the full pump pressure prevailing in the feedback conduit 39, while the same pressure, transmitted to the chamber 29' by the connecting conduit 43, pushes the ball 32' against the valve seat 31' in the pilot valve 28.

The control conduit 38 and the connected compartment of the power valve 25 are vented to the sump, which is under approximately atmospheric pressure, through the chamber 29, the orifice in the valve seat 31, and the discharge conduit 40 of the valve 26. The supply conduit 36 is connected to the cylinder of the non-illustrated jack or lift for operating the same under full hydraulic pressure. The power valve 26 is held closed by line pressure transmitted through the connecting conduit 43, the valve 28, and the control conduit 42.

When the armature 33 releases the ball 32 and pushes the ball 32' against the valve seat 30', the pressure in the nonillustrated jack is transmitted through the supply conduit 41 to the valve 26 while the control conduit 42 is vented to the sump through the opened valve seat 31'. The power valve 26 is opened and permits the cylinder of the jack or lift to be drained to the sump. The discharge conduit 37 of the power valve 25 is equally vented to the sump while full pump pressure is transmitted to the control conduit 38 through the feedback conduit 39. The power valve 25, therefore, is closed.

The portion of the apparatus of FIG. 3 which includes the valves 25, 27 and associated conduits thus operates as described with reference to FIG. 1, and differs structurally from the apparatus of FIG. 1 by the features of the valve 25, not explicitly shown in FIG. 3, which have been described with reference to FIG. 2, and by the specific structure of the pilot valve.

The portion of the apparatus of FIG. 3 which includes the valves 26, 28 differs from the first-described portion in that the fluid in the supply conduit 41 is normally at lower pressure than the full pump pressure applied to the control conduit 42 through the open orifice of the valve seat 30'. The control conduit 42 is connected to the supply conduit 42 of the valve 26 by a feedback circuit constituted by the conduits 43, 36, and 37, but the functions of this circuit are altered substantially, as compared to FIG. 1, by the pump pressure continuously maintained in the conduit 36, and higher than the pressure in the supply conduit 41 of the power valve 26.

Two pairs of power valves may be combined in a manner obvious from FIG. 3 for controlling a double-acting, reciprocating, hydraulic motor if the associated pilot valves are coupled electrically or mechanically to vent one compartment of the motor while the other one is being charged with liquid under pump pressure and vice versa. FIG. 4 shows a modification of such a motor in which the strokes of the motor are not initiated by an operator handling a switch, as is implied in the arrangement of FIG. 3, but in which the piston of the motor moves back and forth continuously without the intervention of an operator.

The motor has a fixedly mounted cylinder 44 whose cavity is axially divided into two compartments by a piston 45. A piston rod 46 projects from the cylinder and is fastened or connected to a load, such as a stamping die, in a conventional manner, not shown. The piston is reciprocated in the cylinder by means of hydraulic fluid under pressure supplied by a pump 47 which draws the fluid from an open sump 48. Four power valves 49, 50, 51, 52 control the flow of fluid from the pump 47 to either compartment in the cylinder 44, and from the other cylinder compartment to the sump 48. The valves are each of the type seen in FIG. 2, but have been outlined diagrammatically for the sake of clarity.

The power valves are opened and closed by means of a two-way pilot valve 53. The chamber 54 of the valve 53 has the shape of an elongated cylinder axially bounded by approximately hemispherical end walls. Axial bores through the two end walls receive respective pins 55, 56 in sealing, movable engagement, the seals and packings employed not being shown. A spherical control element 57 is axially movable in the chamber 54 between two terminal positions in which it connects an axially central orifice 58 with respect orifices 59, 60 in the end walls of the chamber while sealing the other orifice.

A high-pressure conduit or line 61 permanently connects the output of the pump 47 to the orifice 58 and to the supply orifices of the valves 50, 52, while a return line 62 permanently connects the discharge orifices of the valves 49, 51 to the sump 48. A control line 63 connects the orifice 59 of the pilot valve 53 to the control orifices of the valves 49, 50, while a control line 64 connects the orifice 60 to the control orifices of the valves 51, 52. One compartment in the cylinder 44 is permanently connected by a line 65 to the discharge orifice of the valve 50 and the supply orifice of the valve 51 while the other compartment communicates with the supply orifice of the valve 49 and the discharge orifice of the valve 52 through a connecting line 66.

In the illustrated condition of the apparatus, full line pressure in the control conduit or line 64 keeps the valves 51, 52 closed while the control conduit 63 is blocked by the element 57 sealing the orifice 59. The valves 49, 50, therefore, are open and respectively admit fluid under pressure to one compartment of the cylinder while draining the other compartment to the sump 48. The piston 45 and piston rod 46, together with the non-illustrated load, are moved in the direction indicated by an arrow until an abutment 67 on the piston rod 46 strikes the pin 55 and shifts the control element 57 into its other terminal position, whereby the valves 49, 50 are closed, the valves 51, 52 are opened, and the direction of piston movement is reversed. Another reversal of piston travel occurs when another abutment 68 on the piston rod 46 strikes the pin 56 and returns the pilot valve 53 to the illustrated condition. Non-illustrated stops prevent the pins 55, 56 from being expelled from the valve 53 by the pressure of the hydraulic fluid.

It has been found that the power valves of the invention may readily be dimensioned to switch between the terminal positions of their spherical control elements in substantially fewer than ten milliseconds after application of a positive or negative pressure signal to their control orifices, a switching time of 1 millisecond being capable of being achieved with power valves employing spherical control elements of 4 mm diameter and controlling the flow of hydraulic fluid under a pressure of several hundred atmospheres. The actual operating speed of power valves of the preferred type illustrated in FIG. 2 is usually limited by the rate at which the associated pilot valves can be shifted. Fastest shifting has been accomplished so far with electromagnetically operated ball valves of the type shown in FIG. 3, and such valves may be substituted for the rotary valve 7 in FIG. 1 and the mechanically shifted pilot valve 53 shown in FIG. 4 in an obvious manner, the abutments 67, 68 cooperating with limit switches in the power circuit of the pilot-valve solenoid in the modified arrangement.

The use of spherical control elements has been found to be essential for best operating characteristics of the devices of the invention. Metal balls of precise dimensions and perfectly spherical shape are an inexpensive staple article of commerce. They have been found to turn randomly about their centers in the valves so that the unavoidable wear due to engagement with the valve seats at the control and discharge orifices is uniformly distributed about their entire surfaces and a perfectly tight seal of one of the other orifice is achieved over a long period of operation without requiring replacement of the control element.

It is most economical to have the control chamber of the valve illustrated in FIG. 2 bounded axially by flat end walls, as illustrated. Modifications of the valve in which the end wall formed with the control orifice is shaped to conform with the ball 22, and thus to obliterate the compartment near the control orifice in one terminal position of the control element, are operative under some conditions and are within the scope of this invention in its broadest aspects.

The fluidic control units of the invention presently have their most fruitful practical application in controlling the flow of hydraulic fluid to and from hydraulic motors or other transducers which move an operating element in response to the pressure of the controlled fluid. Because of the extremely short available switching times, they may also be employed to advantage in hydraulic logic circuits and other applications which will readily suggest themselves to those skilled in the art.

It should be understood, therefore, that the foregoing disclosure relates only to preferred embodiments of the invention, and that it is intended to cover all changes and modifications of the examples of the invention herein chosen for the purpose of the disclosure which do not constitute departures from the spirit and scope of the invention set forth in the appended claims.

What is claimed is:

1. A fluidic control unit comprising:
   a. wall means defining an elongated control chamber, said wall means including an annular longitudinal wall and longitudinally spaced first and second end walls;
   b. a discharge conduit terminating in a discharge orifice in said first end wall;
   c. a control conduit terminating in a control orifice in said second end wall;
   d. a spherical control element longitudinally guided in said chamber by said wall means between two terminal positions in which said element seals said orifices respectively,
      1. said element and said first end wall longitudinally bounding a first compartment in said chamber in all positions of said element,
      2. said element and said second end wall longitudinally bounding a second compartment in said chamber in all positions of said element intermediate said terminal positions;
   e. a supply conduit terminating in a supply orifice in said wall means and directly communicating with said first compartment through said supply orifice in all positions of said element; and
   f. a feedback conduit outside said chamber connecting said supply conduit with said second compartment.

2. A unit as set forth in claim 1, wherein said feedback conduit communicates with said control conduit and thereby connects said supply conduit with said second compartment.

3. A unit as set forth in claim 2, further comprising a shut-off valve in said control conduit, said feedback conduit communicating with a portion of said control conduit intermediate said valve and said control orifice.

4. A unit as set forth in claim 2, further comprising valve means in said feedback conduit, and operating means for shifting said valve means between a first position in which pressure fluid may flow from said supply conduit to said control orifice through said control conduit, and a second position in which said flow is blocked and said control is vented for release of pressure fluid from said second compartment.

5. A unit as set forth in claim 4, wherein said control conduit, the portion of said feedback conduit intermediate said control conduit and said valve means, and said valve means jointly constitute a pressure relief conduit, said element and said annular wall bounding therebetween a restricted throttling passage connecting said compartments, said passage having an effective flow section substantially smaller than the flow section of said pressure relief conduit, but sufficient substantially to prevent friction between said element and said annular wall during longitudinal movement of said element in said chamber and to permit rotation of said element, when fluid is supplied to said chamber through said supply conduit.

6. A unit as set forth in claim 5, wherein said annular wall is cylindrical and formed with said supply orifice, said control orifice and said discharge orifice being located in the axis of said cylindrical wall.

7. A unit as set forth in claim 5, wherein said supply orifice is substantially annular about said axis.

8. A unit as set forth in claim 7, wherein said orifices constitute the only openings in said wall means.

9. A unit as set forth in claim 1, wherein said end walls are transverse to the direction of elongation of said chamber, and said orifices are open in said direction, said control element engaging said discharge and control orifices in said two terminal positions respectively.

10. A fluidic control arrangement comprising:
    a. wall means defining an elongated control chamber, said wall means including an annular longitudinal wall and longitudinally spaced first and second end walls;
    b. a discharge conduit terminating in a discharge orifice in said first end wall;
    c. a control conduit terminating in a control orifice in said second end wall;
    d. a spherical control element longitudinally guided in said chamber by said wall means between two terminal positions in which said element seals said orifices respectively,
       1. said element and said first end wall longitudinally bounding a first compartment in said chamber in all positions of said element,
       2. said element and said second end wall longitudinally bounding a second compartment in said chamber in all positions of said element intermediate said terminal positions,
       3. said element and said annular wall bounding a restricted throttling passage therebetween, said passage connecting said compartments;
    e. a supply conduit terminating in a supply orifice in said wall means and directly communicating with said first compartment through said supply orifice in all positions of said element;
    f. a first source of fluid under pressure operatively connected to said main supply conduit for supplying said fluid to said first compartment;
    g. a second source of fluid under pressure operatively connected to said control conduit for supplying fluid to said second compartment;
    h. valve means in said control conduit; and
    i. valve operating means for shifting said valve means between a first condition in which fluid may flow from said second source to said second compartment, and a second condition in which said control conduit is vented for release of pressure fluid from said second compartment.

11. A unit as set forth in claim 10, wherein said end walls are transverse to the direction of elongation of said chamber, and said orifices are open in said direction, said control element engaging said discharge and control orifices in said two terminal positions respectively.

12. An arrangement as set forth in claim 11, further comprising a fluid-operated motor connected to said main discharge conduit for receiving the fluid of said first source when said control element is spaced from said main discharge orifice.

13. An arrangement as set forth in claim 11, wherein said valve means include a valve housing, formed with two apertured valve seats and communicating with said control orifice, and a valve member in said housing, said valve operating means including means for moving said valve member between positions of sealing engagement with said valve seats respectively, one of said valve seats communicating with said second source and the other valve seat communicating with a space under substantially atmospheric pressure, the pressure of the fluid of said second source being substantially higher than atmospheric pressure.

14. An arrangement as set forth in claim 13, said valve operating means including an armature, electromagnetic means for moving said armature, and motion transmitting means for transmitting movement of said armature to said valve member.

* * * * *

UNITED STATES PATENT OFFICE
CERTIFICATE OF CORRECTION

Patent No. 3,823,741　　　　　　　　　Dated July 16, 1974

Inventor(s) HELMUT HIRN ET AL

It is certified that error appears in the above-identified patent and that said Letters Patent are hereby corrected as shown below:

In the heading, line [73], change "Riko" to -- RILCO --.

Signed and sealed this 29th day of October 1974.

(SEAL)
Attest:

McCOY M. GIBSON JR.　　　　　　　　C. MARSHALL DANN
Attesting Officer　　　　　　　　　Commissioner of Patents